United States Patent [19]

De Rooij et al.

[11] Patent Number: 5,045,335
[45] Date of Patent: Sep. 3, 1991

[54] METHOD FOR IMPROVING THE FLAVOUR CHARACTERISTICS OF POTATO PRODUCTS

[75] Inventors: Johannes F. M. De Rooij, Hilversum; John D. Simmons, Naarden, both of Netherlands; Willem Van Osnabrugge, Hunt Valley, Md.

[73] Assignee: Unilever Patent Holdings B.V., Vlaardingen, Netherlands

[21] Appl. No.: 569,379

[22] Filed: Aug. 15, 1990

Related U.S. Application Data

[63] Continuation of Ser. No. 361,378, Jun. 12, 1989, abandoned, which is a continuation-in-part of Ser. No. 129,775, Dec. 7, 1987, abandoned.

[30] Foreign Application Priority Data

Dec. 5, 1988 [EP] European Pat. Off. ............ 88202772

[51] Int. Cl.$^5$ .............................................. A23L 1/217
[52] U.S. Cl. ..................................... 426/533; 426/438; 426/637
[58] Field of Search ...................... 426/533, 637, 438

[56] References Cited

U.S. PATENT DOCUMENTS

| | | | |
|---|---|---|---|
| 2,498,024 | 2/1950 | Baxter | 426/637 X |
| 2,589,591 | 3/1952 | Xander | 426/637 X |
| 3,493,395 | 2/1970 | Soeters | 426/533 |
| 3,594,187 | 7/1971 | Liepa | 426/637 |
| 3,741,775 | 6/1973 | Lee | 426/533 |
| 3,814,818 | 6/1974 | Champ et al. | 426/637 X |
| 3,930,044 | 12/1975 | van de Rovaart et al. | 426/533 |
| 3,930,045 | 12/1975 | Mosher et al. | 426/533 |
| 3,930,046 | 12/1975 | Baugher | 426/533 |
| 4,604,290 | 8/1986 | Lee et al. | 426/533 |
| 4,698,230 | 10/1987 | Willard | 426/637 X |

FOREIGN PATENT DOCUMENTS

| | | |
|---|---|---|
| 0030327 | 6/1981 | European Pat. Off. . |
| 0160794 | 11/1985 | European Pat. Off. . |
| 1423176 | 1/1965 | France . |
| 2015390 | 4/1970 | France . |
| 2181585 | 7/1973 | France . |

OTHER PUBLICATIONS

Cram et al., "Organic Chemistry", Ed. 2, 1964, International student edition, McGraw-Hill, New York, p. 648.

Primary Examiner—Arthur L. Corbin
Attorney, Agent, or Firm—Cushman, Darby & Cushman

[57] ABSTRACT

A method for improving the flavour characteristics of potato products which are to be fried, which comprises treating the potato product before frying with a flavour mixture consisting essentially of the product obtained by heating a mixture of a reducing sugar, amino acid and a sulphur donor compound to a temperature between 70 and 180° C.

9 Claims, No Drawings

METHOD FOR IMPROVING THE FLAVOUR CHARACTERISTICS OF POTATO PRODUCTS

This is a continuation of application Ser. No. 364,378, filed on June 12, 1989, which was abandoned upon the filing hereof, and which is a continuation-in-part of Ser. No. 129,775, filed Dec. 7, 1987, now abandoned.

INTRODUCTION

The invention relates to a process for improving the flavour characteristics of potato products in which the potato material is treated with a flavour mixture prepared by heating a mixture containing a reducing sugar and amino acid(s). More in particular, the invention relates to improving the flavour of potato products like French fried potatoes, chips and crisps so that these potato products have a beef or meat-like flavour.

BACKGROUND OF THE INVENTION

A process for improving the flavour of potato is known from U.S. Pat. No. 3,814,818 by preparing an edible oil composition, which oil composition is prepared by adding 0.001-4.0% by weight methionine to an oil and heating the oil to 120°-220° C. It might be preferred according to that U.S. patent to further add a reducing sugar in an amount of 1-25% by weight of said methionine. At all event, the end product is an oil mixture in which the potato can be fried. According to the invention, the flavour is prepared without using the oil by reacting the starting materials for the flavour product at an elevated temperature after which the potato product is treated with the preferably aqueous solution of the processed flavour mixture so that a surface layer containing an effective amount of the processed flavour mixture is present on the potato product.

From U.S. Pat. No. 2,589,591, a method for controlling color and flavour of potato chips is known in which the potato is immersed in an aqueous solution of a reducing sugar and a protein hydrolyzate derived from raw potatoes. The protein hydrolyzate gives a number of amino acids and an example of such a mixture is given in Column 3, lines 4-16 of the above-mentioned U.S. patent indicating 13 different amino acids.

SUMMARY OF THE INVENTION

The flavour characteristics of a potato product can further be improved, by using specific amino acids and by further controlling the reaction between the reducing sugar and the amino acid.

DESCRIPTION OF PREFERRED EMBODIMENTS

It has now been found that better and more economic results can be obtained if potatoes or potato parts are subjected to treatment with a dilute solution of a specific processed flavour before frying takes place. The processed flavour generally is a heated aqueous mixture of a reducing sugar and amino acid(s) characterized in that the flavour mixture is prepared by heating the mixture of a reducing sugar and amino acid(s) to a temperature between 70° and 180° C. in which mixture a sulphur donor compound is present.

The sulphur donor is present in the mixture for preparing the flavour or in the flavour mixture in the form of an amino acid chosen from the group consisting of cysteine, cystine and methionine. The sulphur donor can also be present by the addition of Alliums such as onion products, garlic, egg products, thiamine and/or by the addition of $H_2S$ or salts thereof. The flavour mixture also can comprise a peptide and/or protein. In the process flavour mixture, a reducing sugar like ribose, arabinose, glucose, galactose, mannose, rhamnose, sucrose, xylose or ascorbic acid should be present. The amino acid mixture should preferably contain glutamic acid, but amino acid(s) such as lysine and alanine can have a positive effect depending on the organoleptic profile required. The amino acid(s) employed to prepare the process flavour can conveniently be obtained in the form of protein hydrolysates or a fraction thereof and from casein, gluten or yeast hydrolysates.

The weight ratio of the various ingredients is preferably as follows. Reducing sugar: amino acids (containing 2 to 100% of cysteine, cystine or methionine and preferably 10 to 90% of glutamic acid), peptide and/or protein between 1:1 and 1:10. A suitable processed flavour can be obtained by heating an aqueous mixture containing the ingredients specified above to a temperature between 70° and 140° C. for a period varying between a few seconds and several hours and at least during part of the heating some water should be present.

Also of benefit can be the use of phosphate and/or organic acids such as citric, acetic, tartaric and lactic acids or their salts.

It is obvious that the process flavour can be made into a commercial product, in the form of liquid, paste or powder, by mixing with a proper carrier which might be by choice salts (e.g. NaCl), proteins (e.g. gelatin, casein) or polysaccharides such as starches, gums, dextrins, etc.

For plain chips (usually called crisps in the United Kingdom) and French fried potatoes, having at most a slight savoury note, the potato parts are dipped in an aqueous solution containing from 0.005 to 0.2, preferably from 0.01 to 0.1% by weight of the processed flavour, but more strongly flavoured potato products up to 2%, preferably up to 1% of the processed flavour mixture is used.

One convenient method for processing potato parts according to the present invention is to treat the potato (parts) during thermal blanching in an aqueous solution of the processed flavour in the concentrations indicated above. Another convenient method is to incorporate the processed flavour in a sugar dip step, which is often included in the processing of potato material, more in particular, in the preparation of French fried potatoes. Also it has been found advantageous, in particular when preparing extruded potato products, to incorporate the processed flavour in the mash. Furthermore, it has been found useful for certain products to add the processed flavour by a spraying operation before deep-frying or oven-frying takes place.

During the frying operation, the processed flavour mixture, which contains flavour precursor compounds like addition products of reducing sugars, amino acids, and sulfhydryl compounds, which have attached to the potato material react upon heating further to form flavour compounds like maltols, furanones, thiazolidins, thiophene derivatives, etc. The mildly heating step to which the processed flavour has been subjected serves to form coupling products, which act as flavour precursors but the mild condition prevent substantial conversion into actual flavour compounds at this stage of the processing.

The potato material processed according to the present invention can be whole potatoes (but then preferably small ones), but generally only potato parts like cubes, sticks, slices or powder is processed leading to products like fried potatoes, fried cubes, French fried potatoes, potato chips and potato crisps.

The processing of the potato parts usually comprises a number of steps such as:
immerse potato parts in (nearly) boiling water, containing some salt (thermal blanching),
bringing back to (near) boiling temperature,
leave boiling for a short period,
sieve out the potato parts,
dip potato parts in cold water,
dry the potato parts,
fry potato parts for a few minutes,
freeze the sieved-out potato parts,
fry frozen pre-fried potato parts for longer period.

Optional steps include sulphite treatment of the potatoes, to standardize the colour and a sugar dip, which serves to standardize the flavour and these may replace one or more of other steps mentioned above.

Frying of the potato parts takes place in an oven or in heated oil or fat at a temperature between 140° and 180° C. The oil or fat can be of animal or vegetable origin and beef tallow and soybean oil are preferred. The terms oil and fat are regarded as synonyms in this application. Oils and fats are not only understood to be triglycerides, but also non-toxic material with physical properties comparable to those of triglycerides and which may be indigestible as e.g. jojoba oil or fatty acid esters of mono- and disaccharides or mixtures of several materials.

The invention is illustrated by the following examples.

EXAMPLE 1

A processed flavour composition was prepared by heating an aqueous slurry of 45% solids content to 100° C. for 2 hours. The solid material consisted of: xylose (2 parts by weight), yeast autolysate (5 parts by weight), cysteine (2 parts by weight), malt powder (0.5 parts by weight), monosodium glutamate (2 parts by weight) and a suitable amount of a phosphate buffer as to obtain an end pH of 6.0.

The procedure to obtain French fried potatoes included the preparation of a solution of tap water containing 1% of salt, which was heated to the boil, the processed flavour described above was added to a level of 0.2%, the potato parts (French fries of ½ cm cross section) were added, water and potato material were brought back to the boil and left boiling for 1 minute, the potatoes were sieved out and dipped in cold (20° C.) water and were dried on a paper towel followed by 3 minutes deep-frying in maize oil of 140° C., the potatoes were sieved out and frozen and after some rest deep-fried again in maize oil of 16.0° C. The French fried potatoes so obtained were tested by a panel of six experienced tasters, all of whom indicated a rich beef-like flavour note which was not noted in the unflavoured chips also fried in vegetable oil.

EXAMPLE 2

Flavoured crisps were prepared by adding thinly sliced potatoes (cross section of approximately 0.2 cm) to a blanching bath consisting of tap water containing 1.5% of the spray-dried flavour described in Example 1. The blanching of the potatoes was carried out for 5 minutes at a temperature of 80°–85° C. Next, the potatoes were washed thoroughly with cold water to remove excess starch and then dried with paper towels. Subsequently, the sliced potatoes were fried in peanut oil for 3 minutes and 45 seconds at 170° C. A panel of six experienced tasters compared these crisps against crisps made by the same procedure, but without the flavour being added to the blanching water. There was a unanimous opinion of the tasters that the crisps prepared with the flavour in the blanching water had a full-flavoured meaty character, which was not present in the unflavoured crisps.

EXAMPLE 3

The process of Example 1 is repeated by using gelatin (100 bloom) in place of malt powder and citrate in place of phosphate.

EXAMPLE 4

The process of Example 1 is repeated but by heating now a processed flavour paste of 80–95% solids at a temperature of 80° C. for 3 hours.

EXAMPLE 5

The process of Example 1 is repeated but by using now thiamine and onion in place of cysteine. Lysine is used instead of yeast autolysate, glucose in place of xylose and heating the mixture at a solids level of 38% at 120° C. for 30 minutes.

What is claimed is:

1. A method for improving the flavour characteristics of a potato product so as to provide the potato product with a meat-like flavor on frying, which comprises treating the potato product before frying with a previously prepared aqueous flavour mixture consisting essentially of the product obtained by heating an aqueous slurry of a mixture of a reducing sugar, and amino acid selected from the group consisting of lysine, glutamic acid and alanine and a sulphur donor compound selected from the group consisting of cysteine, cystine, allium, $H_2S$ or salts of $H_2S$ to a temperature between 70° and 180° C. whereby the reducing sugar, amino acid and sulphur donor are preliminarily reacted together to form said flavour mixture and thereafter frying the thus-treated potato product in oil.

2. A method according to claim 1 wherein the reducing sugar is chosen from the group consisting of ribose, arabinose, glucose, galactose, mannose, rhamnose, sucrose, xylose and ascorbic acid.

3. A method according to claim 2 wherein the weight ratio of reducing sugar: amino acid is 1:1–1:10.

4. A method according to claim 3 in which the potato product comprises chips or French fries.

5. A method according to claim 1 in which the potato product is subjected to a treatment with an aqueous solution of the processed flavour mixture.

6. A method according to claim 5 in which the potato product is subjected to a blanching step or to a sugar dip step and the treatment with said flavour mixture is carried out during the blanching step or during the sugar dip step.

7. A method according to claim 5 in which the potato product is fried and the treatment comprises spraying the potato product with said flavour mixture prior to the frying step.

8. A method according to claim 1 in which, after contacting with the flavour mixture, the potato product is heated to a temperature up to 120° C. in heated oil or fat.

9. A method according to claim 1 in which the potato product is treated so that it comprises a surface layer containing an amount of the flavour mixture effective to improve the flavour of said potato product.

* * * * *